United States Patent [19]

Schmitz

[11] Patent Number: 5,315,515
[45] Date of Patent: May 24, 1994

[54] REMOTE VEHICLE CONTROLLER

[75] Inventor: John J. Schmitz, Macomb County, Mich.

[73] Assignee: The United States of America as represented by the Secretary of the Army, Washington, D.C.

[21] Appl. No.: 902,264

[22] Filed: Jun. 22, 1992

[51] Int. Cl.⁵ .................. H04Q 7/02; G05D 3/10
[52] U.S. Cl. ............... 364/424.01; 364/424.05; 180/167; 180/169
[58] Field of Search ............ 364/424.01, 424.05; 180/167–170; 340/870.11

[56] References Cited

U.S. PATENT DOCUMENTS

| | | | |
|---|---|---|---|
| 4,236,594 | 12/1980 | Ramsperger | 180/167 |
| 4,334,221 | 6/1982 | Rosenhagen et al. | 340/825.72 |
| 4,476,954 | 10/1984 | Johnson et al. | 180/333 |
| 4,893,240 | 1/1990 | Karkouti | 364/424.05 |
| 5,029,233 | 7/1991 | Metroka | 455/11 |
| 5,043,646 | 8/1991 | Smith, III et al. | 318/581 |
| 5,054,569 | 10/1991 | Scott et al. | 180/167 |

Primary Examiner—Thomas G. Black
Assistant Examiner—Julie D. Day
Attorney, Agent, or Firm—Gail S. Soderling; Peter A. Taucher

[57] ABSTRACT

A remote control system is disclosed for use with vehicles having radios. A first vehicle has a controller attached to the radio for use in sending signals to a second vehicle. The second, remotely controlled, vehicle has a receiver connected to the vehicle radio which receives commands from the first radio to effect the desired motion and action of the second vehicle. The receiver and controller have circuitry which allows them to be reprogrammed to function on various military vehicles and also be attached to the different radio systes in use by the U.S. Military.

1 Claim, 1 Drawing Sheet

REMOTE VEHICLE CONTROLLER

GOVERNMENT INTEREST

The invention described herein may be manufactured, used and licensed by or for the Government for governmental purposes without payment to me of any royalty.

BACKGROUND OF THE INVENTION

1. Field of the Invention

In one aspect this invention relates to the remote control of vehicles. In a further aspect this invention relates to the control of military vehicles.

2. Prior Art

As the lethality of the modern battlefield increases it has become more and more desirable to send remotely controlled vehicles in place of men. As an example, when it is desired to clear a mine field or other battle ground containing unexploded ordnance, a tank or other heavy military vehicle equipped with a mine plow or similar ordnance detonating device could be moved over the dangerous ground clearing a path for humans without exposing people to the ordnance danger.

The remote control of a moveable item is not new, remote control airplanes being one example. However, such devices are limited in scope in that they require specific controls which must be installed in the item during manufacture and which are dedicated to a particular function. Further the sending controller devices are dedicated and can only provide signals to one type of reception control device. Such devices are not readily reprogrammable to fit a variety of vehicles having varying controls and operating modes. For example the military uses both tracked and wheeled vehicles in its day to day operations with existing radios which should be used if an existing vehicle is to be modified quickly and cheaply to either a slave or command vehicle. The problem is compounded by the fact the military uses both analog and digital radio systems. While the vehicles of a given military unit will all use the same radio, a desirable device should be transferable between units with different type radios.

A further problem is the operating characteristics and controls are markedly different between the various military vehicles and a controller which was dedicated to one type of vehicle would not provide the proper control for the other types of vehicles. It is desirable to have a controller which can be reprogrammed to control the desired vehicle and which will have a corresponding receiver modifiable to control the wide variety of vehicles in the military inventory.

BRIEF SUMMARY OF THE INVENTION

The present invention provides a remote control system which can be used with standard military vehicles using their on board equipment and controls without modification and which can be changed as needed to fit the radio installed.

The system of the present invention has a transmitter mounted on a control vehicle having a military radio compatible with the reception characteristics of the military radio on a remote vehicle to be controlled. The transmitter is connected to the military radio of the control vehicle which is used to send signals via standard military radio signal forms to the vehicle being controlled. The transmitter has a housing suitable for mounting on or in the control vehicle and is electrically connected to the military radio mounted in the control vehicle.

Various items are mounted in the housing to allow control of the remote vehicle. First, a plurality of switches are mounted on the housing, there being one switch for each switched function to be controlled in the remote vehicle. Further, at least one control stick or similar control member is connected with the transmitter housing, the control member being adapted to mimic the controls of the remote vehicle. An analog-digital converter will be connected to the control member to convert the analog signals generated by the control member to corresponding digital signals.

A programmable microprocessor is electrically connected to the switches and the analog-digital converter; the microprocessor receives the inputs from the switches and the analog-digital converter. The inputs are processed, using a computer program containing the functional characteristics of the remotely controlled vehicle, to generate a corresponding series of digitized instructions describing the actions to be performed by the remote vehicle switches and on board actuators. The resulting digital instructions are sent to a transmission converter for modification to the proper format for transmission from the control vehicle military radio. A source of electrical power is provided to power the transmitter circuitry and any necessary auxiliary equipment.

The remote controlled vehicle has a receiver connected to the military radio which is part of the remote vehicle's standard equipment. The receiver is adapted to receive the transmissions with the instructions from the control vehicle via the radio linkage. The receiver has a housing with a source of electrical power to provide power to the receiver circuitry the same as the transmitter portion of the control package. A reception converter will receive the radio transmission from the control vehicle military radio with the formatted instructions, and process the transmitted signal into a digital format. The resulting digitized format will be sent to a second programmable microprocessor electrically connected to the converter using software specific to the switch and control actuator functions of the remotely controlled vehicle. The digitized instructions will be converted into the proper format for use by the remote vehicle's switch relays and actuator boards. A digital-analog converter will receive the digitized instructions related to the corresponding controller functions generated by the actuator programmable microprocessor and convert them into analog signals corresponding to the desired control signatures which are then fed to actuator cards to effect the desired maneuvers. Also the desired digital signals are sent to the relays of the remote vehicle switches to activate the desired switches.

DETAILED DESCRIPTION OF PREFERRED EMBODIMENTS

Figure 1:
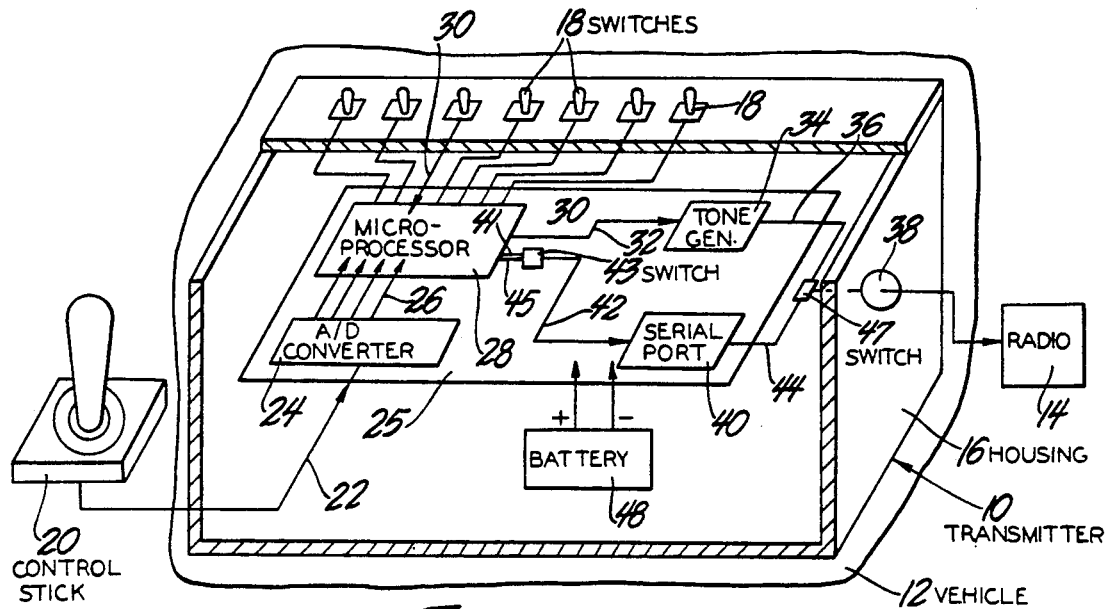
FIG. 1. Is a block diagram of one transmission circuit according to this invention.

Referring to the accompanying drawing and initially to FIG. 1, a transmission apparatus for remotely controlling the movement of a remote military vehicle is designated generally 10. The apparatus 10 is shown resting on a control vehicle 12 only a small portion of the vehicle being represented. The vehicle 12 has a military radio 14, mounted thereon as part of its standard equipment. The exact details of the vehicle 12 and the radio 14 are not set forth in the interest of brevity such information being standard military technology. The radio 14 will be electrically connected to the vehicle electrical system which includes a 24 Volt battery system and suitable alternator driven by the vehicle prime mover. In addition most military vehicles have an auxiliary generator f or producing 24 Volt current so a source of power is not a problem.

The transmitter 10 includes a housing 16 with a plurality of switches 18 mounted on the upper surface of the housing. There is one switch for each switched function to be controlled in the remote vehicle. As shown, there are 7 switches. Some of the representative functions to be controlled include, engine start-stop, gear select, mine plow position, and smoke generator. It is anticipated each function to be controlled will be individually controlled by a single switch. However, depending on the vehicle being controlled, all the switches may not be necessary in which case only the switches necessary will be active.

A control stick 20 is shown in a detached mode with an electrical connection 22 provided to send signals to the transmitter. The control stick 20 can be adapted to mimic the control devices of the remote vehicle to be controlled or may be set up to cause motion of the remote vehicle as a direct consequence of the stick's movement. A stick control is shown and has proved useful as a simple yet effective control device; however, other control devices such as miniature steering wheels and the like would also be acceptable control devices. The control device should be simple yet rugged to allow easy use without a learning curve for the operator, while being able to withstand the extreme conditions under which military equipment is required to operate.

An analog-digital converter 24 is mounted on circuit board 25 attached to the housing 16 and connected to the electrical connection 22 from the control stick 20. The analog-digital converter 24 will convert the analog signals generated by the control stick 20 into representative signals corresponding to the motion desired by the remote vehicle. The analog-digital converter 24 is electrically connected by a line 26 to a programmable microprocessor 28.

The microprocessor 28 could be a version of the INTEL IN8051 microprocessor which is a standard microprocessor quickly reprogrammable without the need for special costly equipment. Such microprocessors can be reprogrammed by feeding the desired program instructions through a serial interface connected to the microprocessor. Because of this reprogramming ability, all that is needed to reprogram the transmitter is a cable connected to a personal computer containing the required instructions. In the illustrated system, the computer containing the required program would be connected to a port 46 and the instructions fed through an RS232 serial port 40 then via line 42 to a switch 43. The switch 43 has two positions, a programming position and a run position. With the switch 43 in the programming position, the program instructions will be sent via line 45 to the microprocessor 28 and retained there as the resident program until changed. This procedure allows the transmission apparatus to be reprogrammed without disassembly and in a matter of minutes. Various programming languages can be used to write the instructions, i.e., assembler C or ADA.

The microprocessor 28 is also electrically connected to the switches 18 by lines 30. The switches 18 will provide a digital type signal since they are two position switches useful to turn various portions of the remote vehicle function on and off.

After the signals have been processed they will be sent from the microprocessor 28 to a device or devices for modulation and/or transmission by the radio 14 to the remote vehicle. As shown, there are two separate and distinct possibilities. This is necessary because the present military force uses two separate and distinct means of radio communications.

Units having older style radios use an analog radio and control signals to be sent via such radios must be in tone format. One example of a tone format for data transfer is the common touch tone phone. Where analog radios are used the signal generated by the microprocessor are sent via line 32 to tone generator 34. The signals are converted by the tone generator 34 to the proper tone signals and the resulting signals sent by line 36 to a two position switch 47. When switch 47 is set to the analog mode, the tones generated are sent via line 37 to a port 38 which is electrically connected to the radio 14 which in turn sends the tone signals to the desired remote vehicle.

Portions of the military use an advanced radio transmitter which accepts the digital signals and provides the tone generator function. When the control vehicle 12 is equipped with this kind of radio, the switch 43 will be set to its run position and the digital signals from the microprocessor will be routed by line 41 from the microprocessor 28 via line 42 through the switch 43 to line 44 connected to a standard digital buss such as an RS232 port 40. Such ports are standard items and well known in the art. The digital signals are routed by line 44 to the switch 47 and then to the radio 14 via the port 38.

A source of electrical power, shown as a battery 48, is provided to furnish the necessary power to the transmitter circuitry. Examples of suitable power sources are rechargeable gel-cell batteries which will provide 40 to 80 hours of operation between charges. Also military vehicles are provided with 24 volt direct current systems and it is apparent to those skilled in the art that the vehicle power, properly modified to the transmitter's characteristics, could be supplied to the circuitry.

Figure 2:
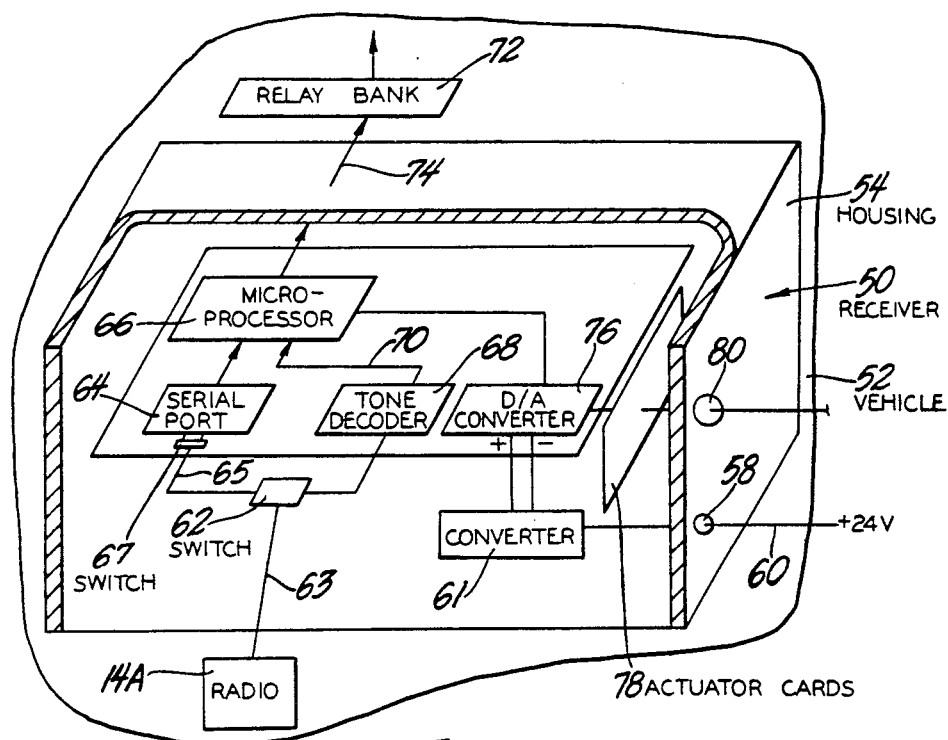
FIG. 2 Is a block diagram of one reception circuit according to this invention.

The receiver apparatus is detailed in FIG. 2 of the drawing and is designated generally 50. The receiver 50 is mounted on a vehicle to be controlled, designated 52, the entire vehicle not being shown. The receiver 50 is attached to a second military radio 14A mounted on the vehicle 52; the radio 14A is compatible with and able to receive the transmissions from the control vehicle radio 14. The receiver 50 has a housing 54 containing those elements necessary to provide an operable remote control system when combined with the remote vehicle 52 and its on-board operating systems. As shown the receiver 50 has an electrical plug 58 connected to the remote vehicle electrical system by a line 60 which will provide a constant supply of 24 Volt direct current for operating the receiver's systems. The plug is in turn connected to a converter 61 which will convert the 24 Volt current to the voltage required by the receiver circuitry. A battery could be used as shown in FIG. 1.

The radio signals are received from the radio 14 by radio 14A and the radio signals are sent to a switch 62 over line 63.

If radio 14A is a modern radio with the tone to digital translator built in, the digital output signal from 14A will be directed through switch 62 to line 65 and into a two position switch 67 corresponding in function to the run-program switch 43 of FIG. 1. Switch 67 will send the digital signals to a serial port 64 and then to the reprogrammable microprocessor 66.

For reprogramming of microprocessor 66, the radio 14A would be disconnected, switch 62 set to the digital port, and the two position switch set to reprogram. A personal computer (not shown) could be connected in place of the radio and then used to down load the required new program as discussed above in connection with reprogramming of the transmitter of FIG. 1.

If the radio is an older model, the incoming signals are sent by the switch 62 to a tone decoder 68 and the tones are converted into the corresponding digital signals for transmission via line 70 to the programmable microprocessor 66.

The programmable microprocessor 66 has been programmed to take the incoming signals and convert them to the appropriate output signals for the operating characteristics of the remote vehicle 52. For example, the switch signals are converted to the appropriate digital signals and transmitted to a relay bank 72 by means of a line 74 to activate those remote vehicle switches which would normally be operated by a vehicle operator. Examples include the starting switch, lights and other vehicle systems noted above.

The control stick 20 functions are processed by the programmable microprocessor 66 and sent to a digital-analog converter 76 where the digital signals are converted into the analog signals corresponding to the desired vehicle operations.

The control signals are sent to actuator cards 78 attached to plug 80, the actuator cards 78 being adapted to provide the necessary signals to operate the controls of the remote vehicle 52.

Both the microprocessors 28, 66 can be reprogrammed by means of a personal computer which would be connected as described above. The computer could be a lap top variety with the programs necessary to operate the vehicle prepared and loaded. When it is desired to install the system the receiver and transmitter are located in the vehicles, attached to the radios and the power sources activated. If necessary, the required software is downloaded from the personal computer into the programmable microprocessors and the system can then function.

There are obvious advantages to sending remote controlled vehicles into a combat zone and such vehicles can be programmed to continue with their mission, such as mine plowing, even when the radio linkage is rendered inoperative by hostile fire.

Various modifications and alterations will become apparent to those skilled in the art with out departing from the scope and spirit of this invention and it is understood that this invention is not limited to the illustrative embodiments set forth above.

What is claimed is:

1. An apparatus for remotely controlling the movement of a first remote military vehicle, having a military radio, from a second command vehicle having a military radio compatible with the transmission characteristics of the military radio on the remote vehicle, comprising a transmitter connected to the military radio of the control vehicle, the transmitter including a housing, a plurality of switches mounted on the housing there being one switch for each switched function to be controlled in the remote vehicle, at least one control means mounted on the transmitter housing, the control means being adapted to mimic the control of the remote vehicle, an analog-digital converter connected to the control means, a programmable microprocessor electrically connected to the switches and the analog-digital converter the microprocessor receiving the inputs from the switches and the analog-digital converter and processing the inputs to a corresponding series of digitized instructions describing the actions to be performed by the remote vehicle and sending the corresponding instructions to a two position switch having a first analog position and a second digital position, the two position switch routing the digitized instructions to a tone generator when placed in the analog position and routing the digitized instructions to a digital bus when in the digital position, the resulting instructions from the tone generator or digital bus are sent to the control vehicle military radio, a source of electrical power to provide power to the transmitter circuitry; and a receiver connected to the military radio of the remote vehicle, the receiver being adapted to receive the transmissions from the control vehicle via the radio linkage with the instructions, the receiver having a housing, a source of electrical power to provide power to the receiver circuitry, a reception converter which receives the radio format transmission from the control vehicle military radio and processes the transmitted signal into a digital format, the reception converter being electrically connected to a programmable actuator microprocessor to receive the processed digitized instructions and convert the digitized instructions into the proper format for use by the remote vehicle, a digital-analog converter which receives the digitized instructions related to the corresponding controller functions generated by the actuator programmable microprocessor and converts them into analog signals corresponding to the desired control signatures which are them fed to the actuator cards of the remote vehicle to effect the desired maneuvers and an output which sends the desired digital signals to the relays of the remote vehicle to activate the desired switches.

* * * * *